United States Patent [19]

Fowler

[11] Patent Number: 4,976,842
[45] Date of Patent: Dec. 11, 1990

[54] OXIDANT GENERATOR

[75] Inventor: James A. Fowler, Los Alamitos, Calif.

[73] Assignee: Envirodynamics Limited, Isle of Man, United Kingdom

[21] Appl. No.: 345,891

[22] Filed: May 1, 1989

[51] Int. Cl.$^5$ .................... C25B 9/00; C25B 15/00
[52] U.S. Cl. ................................ 204/252; 204/261; 204/266; 204/271
[58] Field of Search ............... 204/237, 260, 263–266, 204/273, 261

[56] References Cited

U.S. PATENT DOCUMENTS

| | | | |
|---|---|---|---|
| 4,248,681 | 2/1981 | Sweeney | 204/103 |
| 4,256,552 | 3/1981 | Sweeney | 204/98 |
| 4,290,873 | 9/1981 | Weaver | 204/260 X |
| 4,308,117 | 12/1981 | Sweeney | 204/101 |
| 4,324,635 | 4/1982 | Sweeney | 205/266 |
| 4,334,968 | 6/1982 | Sweeney | 204/96 |
| 4,472,256 | 9/1984 | Hilbig | 204/266 |
| 4,596,648 | 6/1986 | Sweeney | 204/237 |
| 4,793,909 | 12/1988 | Maddock | 204/266 |

Primary Examiner—Donald R. Valentine
Attorney, Agent, or Firm—William P. Green

[57] ABSTRACT

An electrolytic oxidant generator including an anode and cathode within different chambers separated by an ion permeable membrane, and a mixer for circulating saline solution within the anode chamber to enhance dispersal of salt in the solution and maintain the saline solution at high density throughout that chamber. The generator preferably includes an outer shell and a tubular member extending generally vertically within the shell and separating the anode and cathode chambers, with the side wall having a curving portion containing at least one aperture curving with the wall, and with the membrane being secured to and curving with the wall and bridging across the aperture. The inner chamber may take the form of a unit which is removable upwardly from the shell and interfits with the shell in locating relation upon downward movement thereinto. The anode and/or cathode can be connected to the side wall of the inner unit and have their lower ends insertible in interfitting relation into locating socket recesses carried by that wall.

24 Claims, 4 Drawing Sheets

OXIDANT GENERATOR

BACKGROUND OF THE INVENTION

This invention relates to improved generators for producing a mixture of oxidant gases, such as chlorine, chlorine oxides and ozone.

The oxidant generators of the present invention are of a known general type in which an anode within an anode chamber and a cathode within a cathode chamber act to electrolyze a saline solution, to produce oxidant gases at the anode and sodium hydroxide at the cathode, with the anode and cathode chambers being separated by an ion permeable cation exchange membrane through which sodium ions can pass to the cathode. Such generators are shown in U.S. Pat. Nos. 4,256,552, 4,248,681, 4,308,117, 4,324,635, 4,334,968, and 4,596,648, and in prior art referred to in those various patents.

SUMMARY OF THE INVENTION

A major object of the present invention is to provide a generator for producing oxidant gases in a highly efficient manner, with equipment which is very simple, inexpensive and easily maintained. Certain features of the invention relate to the preferred construction of an inner unit of the device, and to the mounting of the ion permeable membrane and the electrodes to that unit. The inner unit is received within an outer shell of the generator, and has a tubular side wall which preferably takes the form of a vertically extending length of plastic pipe containing and defining the anode or cathode chamber, desirably the latter. The other of these chambers, preferably the anode chamber, is formed about the pipe, radially between it and the outer shell. The curving side wall of the pipe contains an aperture or apertures through which the anode and cathode chamber are in communication with one another, and the ion permeable membrane is carried by and curves in correspondence with that side wall at a location to bridge across the aperture or apertures.

The inner unit is desirably constructed and mounted in the shell in a manner enabling rapid removal of the unit upwardly from the shell with the carried membrane, for replacement, repair or cleaning of the membrane when necessary, in order to avoid extended shutdown of the equipment when the membrane becomes clogged or is damaged. A spare similar unit with a replacement membrane can then be substituted, so that the generator can be placed back in operation with a minimum of lost time. The membrane of the removed unit can be cleaned, repaired or replaced while the unit is out of the shell, to return that unit to a condition for subsequent reinsertion into the shell on a next successive repair or cleaning cycle.

The effectiveness of the electrolyzing process in a device embodying the invention is enhanced by provision of means for inducing circulation of the saline solution within the anode chamber, in a manner assuring dispersal of the salt of that solution throughout the chamber, and maintaining the solution at maximum density and in approximately saturated condition at all of the different levels at which the anode contacts the solution. Without such circulation, the density of the solution at higher levels in the anode chamber may be very low, with resultant inefficient production of the oxidant gases at those locations and an unsatisfactorily low overall production of oxidant gases.

The circulation of the saline solution is preferably attained by locating a vaned rotor in the anode chamber in contact with the solution, and driving that rotor, typically intermittently, to induce movement of the solution along a desired circulation pattern. The vaned rotor may be mounted and constructed to cause movement of the solution generally circularly about the cathode chamber. Desirably, the rotor is constructed to also give the motion of the circulating fluid a vertical component, preferably downwardly, to thus enhance dispersal of the salt within the solution both horizontally and vertically in a manner attaining approximate saturation at all points. For this purpose, the rotor may be mounted to turn about an inclined axis, and be driven by a shaft also turning about that axis and extending upwardly through an opening in the top of the generator for connection to a driving motor at the upper side of the top wall of that generator.

The anode and cathode are mounted on opposite sides of and preferably in close proximity to the membrane, and may be connected detachably to the side wall of the removable unit. The lower ends of the anode and cathode may be removably received within and be located by socket structures carried by the removable unit. The removable inner unit is located within the shell by interfitting engagement with locating means carried by the shell. These locating means may include lugs projecting upwardly from a bottom wall of the shell and adapted to engage the removable unit at different sides to prevent horizontal displacement thereof.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
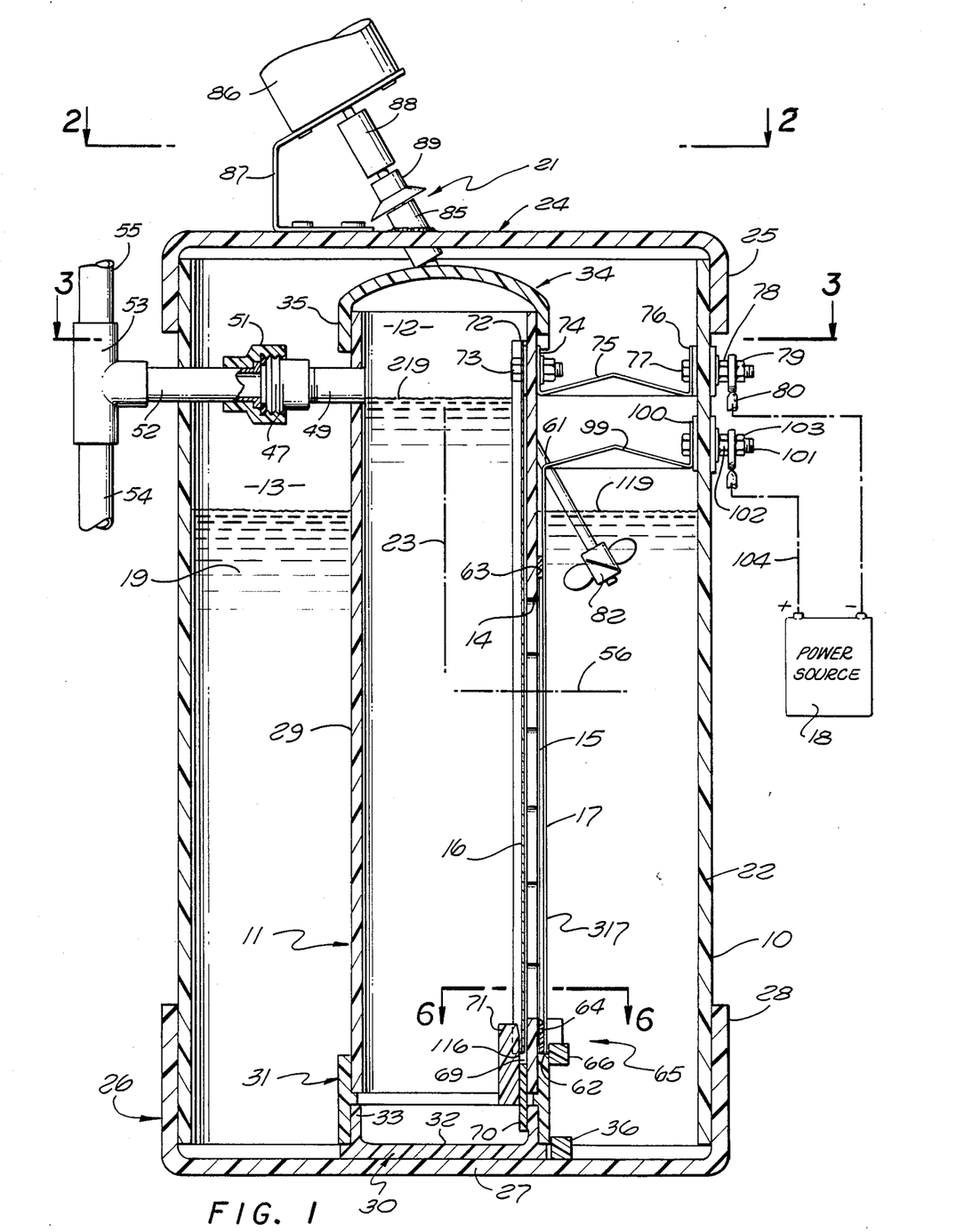
FIG. 1 is a central vertical section through an oxidant generator constructed in accordance with the invention.
Figure 2:
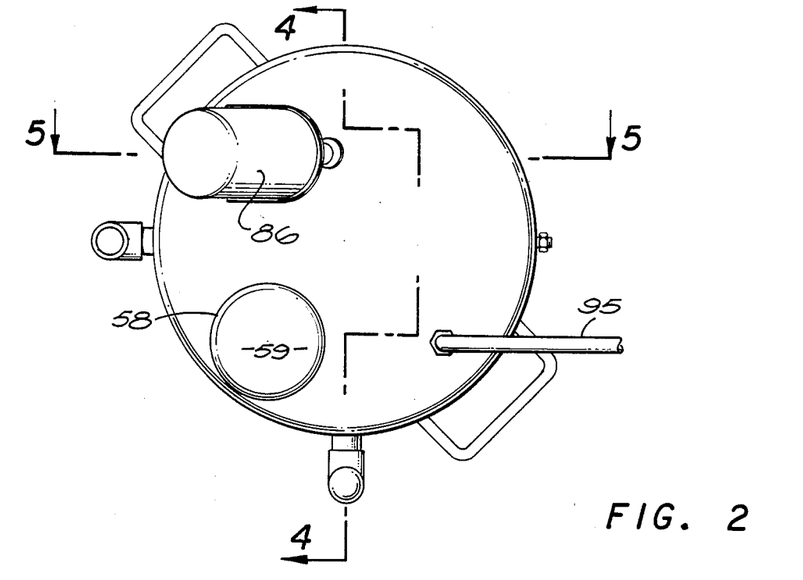
FIG. 2 is a top plan view taken on line 2—2 of FIG. 1.
Figure 5:
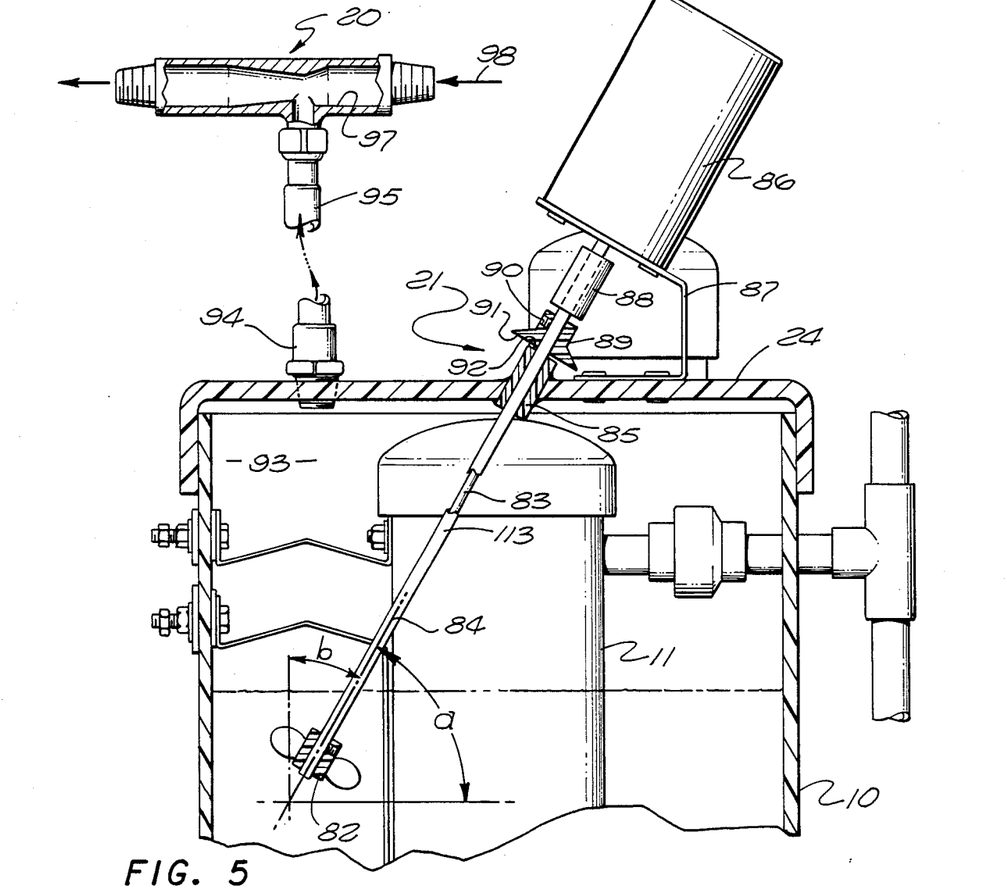

Referring first to FIG. 1, the illustrated preferred oxidant generator embodying the invention includes an outer shell 10 within which a removable unit 11 is mounted at a central location. The unit 11 divides the interior of the shell into a first chamber 12 within unit 11 and a second chamber 13 extending about unit 11. These chambers are in communication with one another through an aperture or apertures 14 formed in the side of unit 11, with an ion permeable membrane 15 being disposed across the aperture. Two electrodes 16 and 17 are positioned at opposite sides of membrane 15, within chambers 12 and 13 respectively, and are energized electrically by a power source 18. Electrode 16 is preferably the cathode of the electrolytic circuit, and electrode 17 is preferably the anode. The shell is filled with a solution of sodium chloride 19, which is electrolyzed to produce mixed oxidant gases at the anode 17 to be withdrawn from the shell by an aspirator 20 (FIG. 5), while a solution of sodium hydroxide (caustic soda) is produced within cathode chamber 12. A mixer unit 21 (FIG. 5) circulates the saline solution within anode chamber 13 both vertically and circularly about unit 11 to disperse and maintain the saline solution at a uniformly saturated strength throughout chamber 13.

The shell 10 is formed of a rigid electrically nonconductive material, such as polyvinyl chloride (PVC). This shell includes a tubular side wall 22 centered about a vertical central axis 23 of the generator and typically consisting of a short length of large diameter cylindrical plastic pipe. The shell is closed at its upper end by a cover 24 forming a horizontal top wall of the container having a cylindrical hub 25 extending downwardly about and fitting closely on the upper end of side wall 22. Similarly, the lower end of the shell is closed by a bottom member 26 forming a horizontal bottom wall 27 having an upwardly projecting circular hub 28 at its periphery fitting closely about the lower portion of the outer surface of side wall 22. All three of these sections 22, 24 and 26 of the shell may be formed of polyvinyl chloride.

The inner unit 11 of the device includes a tubular, preferably cylindrical, side wall 29 of a diameter substantially smaller than the shell and centered about vertical axis 23. Side wall 29 may be a length of PVC pipe. The lower end of this pipe 29 is closed by a plug 30 secured to the pipe by a coupling 31. Plug 30 forms a horizontal bottom wall 32 of central unit 11, and has a cylindrical hub portion 33 projecting upwardly from the bottom wall at a diameter corresponding to side wall 29. Coupling 31 has upper and lower cylindrical portions received closely about the lower extremity of side wall 29 and hub 33 respectively. Coupling 31 is secured permanently and rigidly to side wall 29 by adhesive bonding the parts together annularly and in fluid tight sealed relation. The coupling is similarly secured rigidly and permanently to plug 30 by adhesively bonding these parts together annularly and in sealed relation.

The upper end of unit 11 is closed by a circular cover 34 having a vertical cylindrical hub 35 which fits closely about the upper extremity of side wall 29. Covers 24 and 34 are removable from their associated side walls 22 and 29 respectively, but are sufficiently tight friction fits thereon to remain permanently in place and form gas tight seals until forcibly removed. The bottom plug 30, coupling 31 and cover 34 of inner unit 11 are, like side wall 29 of the inner unit and the three sections of the outer shell, formed of polyvinyl chloride or other electrically nonconductive essentially rigid resinous plastic material.

Figure 3:
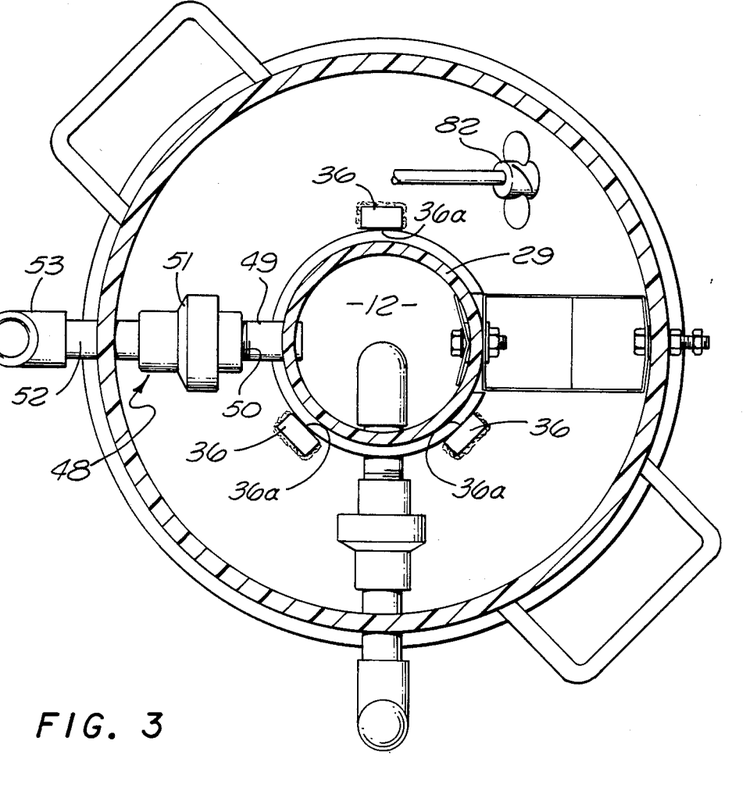
FIG. 3 is a horizontal section taken on line 3—3 of FIG. 1.

The lower end of unit 11 is centered within shell 10 by a plurality of locating blocks or lugs 36, typically three such blocks, which are glued to the upper surface of horizontal bottom wall 27 of the shell at evenly circularly spaced locations (see FIG. 3). These blocks may be of the illustrated rectangular configuration, to present planar inner surfaces 36a engageable with and extending tangentially with respect to the outer cylindrical surface of coupling 31. Unit 11 is installed within shell 10 by movement downwardly along axis 23 and into the space formed between the three blocks 36, to thus inter-fit with those blocks and be effectively retained thereby against horizontal movement in any direction.

Water is filled into the inner cathode chamber through PVC piping 37 (FIG. 4) including a short length of pipe 38 extending horizontally through the side wall of shell 10, a union assembly 39, a short length of pipe 40 connected to and extending through the side wall 29 of unit 11, an elbow connection 41, and a pipe 42 projecting downwardly within chamber 12 and to a location near the bottom of that chamber at which an inclined open end 43 of pipe 42 delivers the water to the chamber. Pipe 38 may be connected at the exterior of the shell to an elbow 44, carrying an upwardly projecting pipe 45 which is closed by a threaded cap 46 except during introduction of water into the generator. Union 39 is of conventional construction, including parts which are connected threadedly together, to provide an easily disconnected joint between pipes 38 and 40.

Excess sodium chloride solution is withdrawn from chamber 12 through PVC piping 48 (FIG. 3) typically including a short length of PVC pipe 49 connected into side wall 29 of unit 11 near the upper end thereof and attached threadedly at 50 to a union assembly 51 corresponding to union 39. This union is in turn attached to a short length of pipe 52 which extends through the side wall of the shell and is connected at the exterior of the shell to a T fitting 53 (FIG. 1) leading to a downwardly projecting drain line 54 and an upwardly projecting vent line 55. When the inner unit 11 of the generator is to be removed, the two sections of each of the unions 39 and 51 are easily and quickly unscrewed (at the location identified by the number 47 in FIG. 1), to break the two connections to unit 11.

Figure 4:
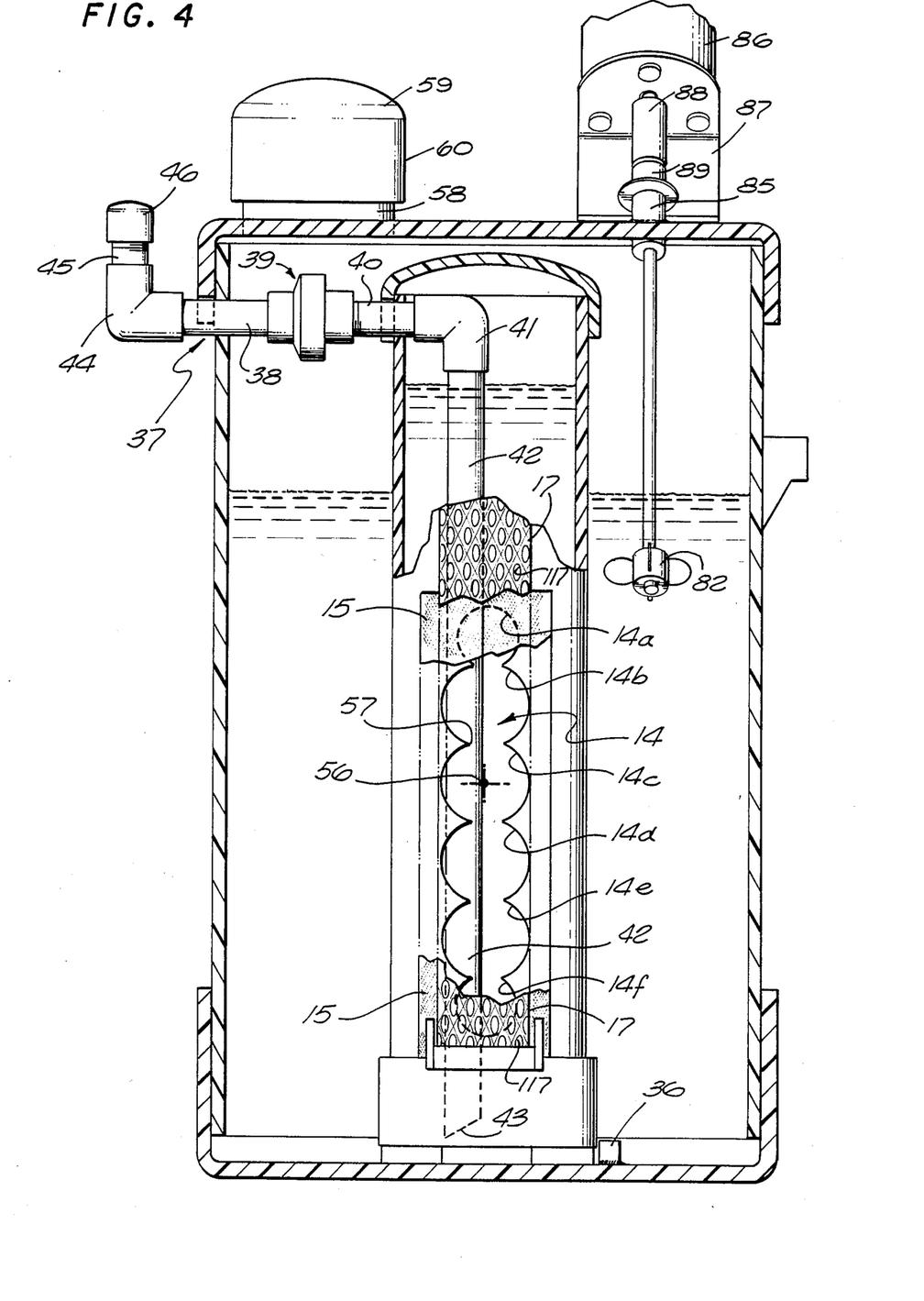
FIGS. 4 and 5 are vertical sections taken on lines 4—4 and 5—5 respectively of FIG. 2.

The aperture 14 in the side wall 29 of unit 11 may be formed by drilling a series of circular holes horizontally through that side wall in a pattern such as that illustrated in FIG. 4. In that figure, the aperture 14 is illustrated as including six circular openings 14a, 14b, 14c, 14d, 14e and 14f centered about vertically spaced and vertically aligned horizontal axes 56, with the successive openings intersecting one another and communicating at the locations 57. The top and bottom openings may be smaller in diameter than the vertically intermediate openings, as shown.

The ion permeable membrane 15 which bridges across the aperture 14 formed by the various circular openings 14a, 14b, etc. may be an essentially rectangular sheet of woven cation exchange membrane material adhered to the outer cylindrical surface of side wall 29 of unit 11, with the sheet of membrane material itself being curved cylindrically in correspondence with the curvature of aperture 14 in that side wall. The membrane material projects upwardly beyond the upper end of aperture 14 and downwardly beyond its lower end, and also projects horizontally beyond the opposite sides of the aperture, and is glued to side wall 29 entirely about the periphery of the aperture. The membrane may be formed of any of the various known cation exchange materials capable of passing sodium ions from the anode chamber to the cathode chamber while resisting reverse movement of sodium hydroxide molecules from the cathode chamber to the anode chamber, to thus retain the caustic solution within the cathode chamber. For example, the membrane may be a modacrylic woven fiber membrane, or a perfluorinated membrane fabricated from copolymers of tetrafluoroethylene and perfluorinated monomers containing sufonic or carboxylic acid groups.

Salt and water can be filled into the annular anode chamber 13 through a fill tube 58 connected into the horizontal top wall of cover 24 of the shell. Except during such introduction of salt or water into the anode chamber, fill tube 58 is closed by a circular cover 59 having a vertical cylindrical hub 60 which is a tight frictional fit on fill tube 58 to form an essentially tight seal therewith.

The anode 17 and cathode 16 are stamped from an appropriate metal or metals capable of withstanding deterioration or corrosion under the conditions encountered in the cell. Preferably, the anode is stamped from titanium and is coated on all of its surfaces except its cut ends with a corrosion resistant conductive substance which is not sacrificial in the electrolytic process. Any known coating material currently employed for this purpose in oxidant generators of the present type may be utilized. The cathode may be formed of 316 stainless steel.

The anode desirably contains a large number of apertures 117 distributed over its entire area, to assist in separating the oxidant gases from the anode during their upward movement to the surface of the saline solution. Preferably, the anode is cut from mesh of the type known as expanded metal.

Figure 6:
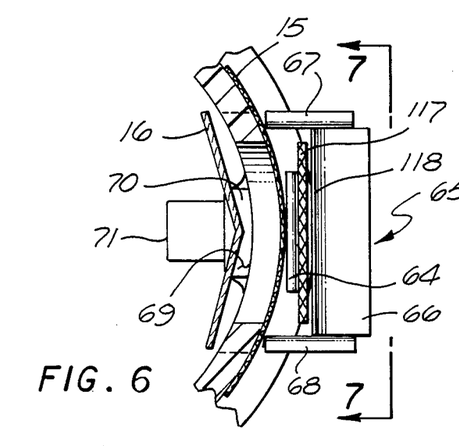
FIG. 6 is a fragmentary horizontal section taken on line 6—6 of FIG. 1.
Figure 7:
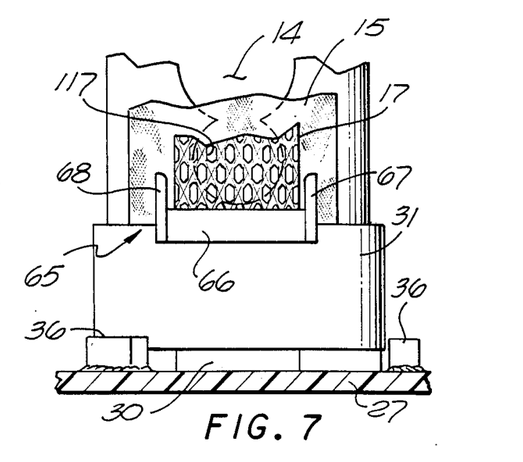
FIG. 7 is a fragmentary view taken on line 7—7 of FIG. 6.

As seen in FIG. 1, the expanded metal mesh forming the anode has a vertically elongated main portion 317 extending downwardly from a location 61 above the surface 119 of the saline solution to a lower extremity at which the anode is cut off to form an essentially horizontal bottom edge 62. Along this entire vertical extent between the locations 61 and 62, the anode has essentially the cross section illustrated at 17 in FIG. 6 (except insofar as that cross section is varied by the expanded metal construction of the anode), and is spaced a short distance from membrane 15 by two thin spacers 63 and 64 above and beneath aperture 14. Spacers 63 and 64 are formed of an appropriate known electrically conductive resinous plastic material, such as polyvinyl chloride, and are cemented in fixed position relative to pipe 29 by a suitable adhesive. The upper spacer is cemented to pipe 29 but not to anode 17, and the lower spacer 64 is cemented to pipe 29, and/or membrane 15 and/or coupling 31, but again is not bonded to anode 17 to thus allow easy detachment of the anode from unit 11.

At its upper end, anode 17 has a portion 99 which extends rightwardly in FIG. 1 and which terminates in an upwardly turned portion 100 which contacts and is retained by an electrically conductive terminal bolt 101 extending through openings in portion 100 and the side wall of the shell. A conductive nut 102 secures the bolt in place and a second conductive nut 103 threaded onto the bolt is tightenable against a lead 104 from the positive side of power source 18 to conduct electricity from the source to the anode.

The lower end of anode 17 is connected to unit 11 by movement of the anode downwardly relative to unit 11 and into a socket recess 118 formed by a structure 65 carried at the lower end of unit 11. This structure 65 may be considered as including the lower spacer 64 and also a horizontally elongated locating block 66 spaced outwardly from and parallel to spacer 64 in the relation illustrated in FIGS. 1 and 6. The narrow spacing between these parts is just sufficient to easily receive and locate the lower end of anode 17. Two members 67 and 68 are glued to opposite ends of member 66, to form the ends of the slot or socket recess within which the lower end of the anode is received. Elements 66, 67 and 68 are formed of non-conductive material such as PVC, and are glued rigidly to the upper portion of coupling 31. It will thus be apparent that in assembling the apparatus the lower end of anode 17 is insertible downwardly within the horizontally elongated socket recess 118 formed between the four elements 64, 66, 67 and 68, and is retained by those elements against horizontal displacement in any direction from the socket recess. When unit 11 is to be removed from the shell, the upper end of anode 17 is disconnected from the shell and the anode is then pulled upwardly out of the socket recess formed by the structure 65.

A similar socket recess 69 is formed at the inner side of the side wall of pipe 29 for receiving the lower end of cathode 16 in interfitting relation. This recess 69 may include a bottom member 70 adhered to the inner side of pipe 29 and portion 33 of plug 30, and a vertically extending block 71 having its lower portion cemented to the outer surface of member 70. The upper portion of element 71 projects upwardly above the level of member 70, to define with a lower portion of pipe 29 the narrow socket recess 69 into which cathode 16 is insertible downwardly. The cathode itself may have the shallow V-shaped horizontal sectional configuration illustrated in FIG. 6, with this cross-section continuing along the entire vertical extent of the cathode from its lower horizontal edge 116 to its upper horizontal edge 72. The cathode is thus received closely adjacent pipe 29 at the location of aperture 14 and extends above and beneath that aperture. Elements 70 and 71 forming the socket recess 69 are, like the other portions of the body of unit 11, formed of a non-conductive material such as polyvinyl chloride.

Near its upper end, cathode 16 is attached rigidly to the side wall 29 of unit 11 by an electrically conductive metal bolt 73 extending through openings in the cathode and in side wall 29 and in a vertically extending portion 74 of a conductive sheet metal strap 75 extending radially between unit 11 and shell 10. The bolt and its nut thus form an effective electrical connection between conductor 75 and cathode 16. At its outer end, conductive strap 75 has an upwardly turned portion 76 which is clamped by a conductive terminal bolt 77 against the inner surface of shell 10, with a nut 78 holding the bolt 77 in place, and with a second nut 79 being adapted to secure a lead 80 from the negative side of power source 18 to the terminal bolt 78 and thus form an electrical connection between lead 80 and the cathode.

The device 21 for circulating the saline solution within anode chamber 13 includes a vaned rotor or propeller 82 which is attached rigidly to an elongated rigid drive shaft 83 extending along an axis 84. This axis is inclined at an angle a with respect to the horizontal and at an angle b with respect to the vertical. Shaft 83 extends upwardly along inclined axis 84 through an electrically non-conductive resinous plastic (typically PVC) tubular bushing 85 glued into an opening in the horizontal portion of cover 24 of the shell. The shaft is a close fit within the cylindrical passage through bushing 85 to be journalled thereby for rotation about axis 84. Propeller 82 and shaft 83 are formed of or coated with a resinous plastic material or materials capable of withstanding corrosion or other damage or deterioration from contact with the saline solution. Preferably, the propeller is molded of polyvinyl chloride and the shaft is formed of steel but coated with a thin layer 113 of PVC.

Shaft 83 and the propeller 82 are driven rotatably by an electric motor 86 mounted at the upper side of the cover of the shell by a bracket 87. The shaft of the motor and shaft 83 are connected by a coupling 88. Beneath the coupling and at the upper end of bushing 85, a water deflecting annular element 89 centered about axis 84 is attached rigidly to and about shaft 83 by a set screw 90. Element 89 has a planar annular undersurface 91 disposed transversely of axis 84 and received in engagement with or slightly spaced from the upper annular end surface 92 of bushing 85. This bushing surface 92 is planar and disposed transversely of axis 84. The lower portion of element 89 and its undersurface 91 project radially outwardly a substantial distance beyond bushing 85 to effectively deflect any rain or other liquid from entering the shell between the bushing and shaft.

Motor 86 drives propeller 82 in a direction causing the angularly disposed vanes of that propeller to produce movement of the saline solution downwardly along axis 84. The inclination of the shaft and propeller gives both a horizontal and vertical component to the movement of the saline solution induced by the propeller. Also, as will be apparent from FIG. 3, the positioning of the propeller and its shaft in the shell is such that the movement of the saline solution caused by the propeller has a component circularly about unit 11 and axis 23 and within annular anode chamber 13. The saline solution is thus circulated circularly within annular chamber 13, and at the same time is directed downwardly to disperse the salt within the solution both circularly and vertically for optimum uniformity and maximum saturation of the solution at all points throughout the anode chamber. By tending to move the solution downwardly rather than upwardly, the apparatus avoids unwanted agitation of the upper surface of the saline solution. Also, the circulation of the solution acts to enhance separation of the generated oxidant gases from the solution and facilitates movement of the gases upwardly through the solution to the space 93 at the top of the shell.

The oxidant gases are withdrawn from space 93 in the upper portion of the shell through a tubular fitting 94 connected into the top wall of cover 24. A hose or other conduit 95 leads the oxidant gases to an aspirator or venturi tube 20 having a venturi passage 97 through which a flow of water to be treated is directed from a supply line 98. Venturi passage 97 progressively tapers to a reduced diameter and then flares to an increased diameter, with the gases from conduit 95 being introduced into the most restricted minimum diameter portion of passage 97. As the water flows through the venturi passage, the oxidant gases are drawn by aspirator action through conduit 95 from the shell, to create a slight vacuum in the upper portion 93 of anode chamber 13. The oxidant gases thus injected into the water stream from line 98 act to disinfect and purify the water and otherwise improve its condition for virtually any use to which the water may be put.

In placing the generator in use, an operator fills water into the anode and cathode chambers, and introduces salt into the annular anode chamber in a quantity sufficient to produce a substantially saturated saline solution in that chamber and also leave an excess of undissolved salt in the bottom of the anode chamber. Sodium hydroxide pellets may be introduced into the cathode chamber 12 in a quantity producing an initial dilute solution of sodium hydroxide in that chamber for the purpose of minimizing the start-up time required for the apparatus. The covers 24, 34 and 59 are then placed in their closed positions of FIGS. 1 and 4, and power source 18 is turned on to energize the anode and cathode with a desired direct current voltage, typically six volts DC at 20 amps. The fluid level within cathode chamber 12 is preferably kept at a level somewhat above the level of the saline solution in anode chamber 13, as seen in FIG. 1. Any excess above this level overflows into drain line 54.

Motor 86 may be energized intermittently to produce circulation of the saline solution within the anode chamber at timed intervals. Usually, the periods of operation of the motor and propeller 82 will be shorter than the intervening periods in which the motor and propeller are not in operation. For example, the propeller may be turned on for three minute intervals and turned off for twelve minute intervals.

Sodium ions from the NaCl solution in the anode chamber are attracted by the cathode through membrane 15 and into the cathode chamber, where they combine with OH ions to produce a sodium hydroxide solution of progressively increasing concentration in the cathode chamber. The chlorine ions from the sodium chloride are attracted to the anode, and form chlorine gas on the surface of and near the anode, with that gas bubbling upwardly through the saline solution to its surface and into the space 93. Other oxidant gases are also formed at the anode, and within space 93, including for example oxides of chlorine such as chlorine dioxide, as well as ozone, hydrogen peroxide, and the like. All of these gases rise to the upper portion of the anode chamber, and are drawn off by aspirator 20 for intermixture with the water being treated.

Propeller 82 produces horizontal, vertical and circular movement of the saline solution in the anode chamber, to disperse the dissolved salt as evenly as possible both vertically and horizontally in a manner maintaining a substantially saturated saline solution at all levels within the anode chamber. By virtue of this saturated condition of the solution at all points at which it contacts the anode, the anode can have maximum oxidant producing effect, and the capacity of the overall generating system can be higher than in prior arrangements in which there is no such circulation of the solution. Without circulation, the solution is near saturation only toward the bottom of the shell, and the concentration gradually decreases toward the top of the saline solution. The electrolyzing effect near the top of the anode chamber is therefore less than optimum.

When the concentration of the caustic solution within cathode chamber 12 becomes excessive, water is introduced into the cathode chamber through piping 37, causing overflow of the caustic solution through piping 48 and drain line 54. Injection of water can be continued until the proper concentration of the caustic solution is attained. When the concentration of the saline solution in the anode chamber falls off, as indicated by a drop in amperage of the electrolyzing current, cover 59 can be removed and additional salt can be filled into the anode chamber through fill tube 58.

If membrane 15 becomes clogged or damaged, the membrane can be very rapidly replaced by removing the entire central unit 11 from the shell and replacing it with another similar unit having a new membrane. Removal of the unit 11 may be permitted by first removing cover 24 and its carried parts, disconnecting the threaded unions 39 and 51 from unit 11, and removing the anode and cathode from their illustrated positions within the device. The cathode can be removed by disconnecting bolt 73 from the upper end of the cathode and then pulling the cathode upwardly from the socket recess within which its lower end is received and entirely out of pipe 29. The anode can be removed by disconnecting bolt 101, and then pulling the anode upwardly from the socket recess within which its lower end is received and out of the shell. Connector strap 75 is removed. The operator then pulls the entire unit 11 upwardly along axis 23, including the interconnected pipe 29, plug 30 and coupling 31, with the lower end of unit 11 moving upwardly out of its interfitting position within locating blocks 35. The membrane of course is carried by the pipe 29 to which it is attached. After removal of unit 11, a replacement unit of the same type can be inserted downwardly along axis 23 to the installed position of FIG. 1, and then be connected to the various elements in the manner previously discussed to place the device back in operation. The new unit 11 will have a new membrane 15 capable of returning the apparatus to its initial condition of complete electrolyzing effectiveness. The membrane of the original unit 11 can be cleaned whenever convenient, and thus be ready for reuse when needed. Alternatively, the membrane of the original unit can of course be cleaned immediately after removal to enable reinsertion of the same unit into the shell.

While a certain specific embodiment of the present invention has been disclosed as typical, the invention is of course not limited to this particular form, but rather is applicable broadly to all such variations as fall within the scope of the appended claims.

I claim:

1. An oxidant generator comprising:
   a shell for containing a saline solution;
   a tubular member extending generally vertically within said shell and having a side wall dividing the shell into a first chamber within the tubular member and a second chamber at the outside of said tubular member;
   an anode in one of said chambers and a cathode in the other chamber to be energized by a power source for production of oxidant gases at the anode and sodium hydroxide at the cathode;
   said side wall of the tubular member having a portion which curves as it advances horizontally about said first chamber and which contains at least one aperture curving with the wall and through which said chambers are in communication with one another;
   an ion permeable membrane secured to said wall and bridging across said aperture and which curves essentially in correspondence with the wall and aperture and is adapted to pass sodium ions from said anode chamber to said cathode chamber while resisting movement of sodium hydroxide from the cathode chamber to the anode chamber; and
   an adhesive securing the periphery of said membrane to said curving portion of said side wall about said aperture.

2. An oxidant generator as recited in claim 1, in which said side wall of the tubular member and said aperture and said ion permeable membrane disposed across the aperture curve cylindrically about an essentially vertical axis.

3. An oxidant generator as recited in claim 1, in which said anode and said cathode extend essentially vertically at opposite sides of said curved membrane.

4. An oxidant generator comprising:
   a shell for containing a saline solution;
   a tubular member extending generally vertically within said shell and having a side wall dividing the shell into a first chamber within the tubular member and a second chamber at the outside of said tubular member;
   an anode in one of said chambers and a cathode in the other chamber to be energized by a power source for production of oxidant gases at the anode and sodium hydroxide at the cathode;
   said side wall of the tubular member having a portion which curves as it advances horizontally about said first chamber and which contains at least one aperture curving with the wall and through which said chambers are in communication with one another; and
   an ion permeable membrane secured to said wall and bridging across said aperture and which curves essentially in correspondence with the wall and aperture and is adapted to pass sodium ions from said anode chamber to said cathode chamber while resisting movement of sodium hydroxide from the cathode chamber to the anode chamber;
   one of said anode and cathode being a conductive plate extending essentially vertically near said curved wall and membrane and having a generally V-shaped horizontal section defining two portions thereof disposed at a small angle to one another to follow approximately the curvature of said curved wall.

5. An oxidant generator comprising:
   a shell for containing a saline solution;
   a unit contained within said shell and having a side wall which extends about and defines a first chamber within the unit and which separates said first chamber from a second chamber about the unit;
   an anode in one of said chambers and a cathode within the other chamber to be energized by a power source for production of oxidant gases at the anode and sodium hydroxide at the cathode;
   said side wall containing at least one aperture through which said chambers are in communication with one another;
   an ion permeable membrane secured to said side wall and bridging across said aperture and adapted to pass sodium ions from said anode chamber to said cathode chamber while resisting movement of sodium hydroxide from the cathode chamber to the anode chamber;
   said unit, including said side wall thereof and said membrane, being insertible downwardly into said shell and removable upwardly therefrom for repair or replacement;
   at least one of said anode and cathode being connected to said side wall of said unit.

6. An oxidant generator comprising:
   a shell for containing a saline solution;
   a unit contained within said shell and having a side wall which extends about and defines a first chamber within the unit and which separates said first chamber from a second chamber about the unit;
   an anode in one of said chambers and a cathode within the other chamber to be energized by a power source for production of oxidant gases at the anode and sodium hydroxide at the cathode;
   said side wall containing at least one aperture through which said chambers are in communication with one another;

an ion permeable membrane secured to said side wall and bridging across said aperture and adapted to pass sodium ions from said anode chamber to said cathode chamber while resisting movement of sodium hydroxide from the cathode chamber to the anode chamber;

said unit, including said side wall thereof and said membrane, being insertible downwardly into said shell and removable upwardly therefrom for repair or replacement; and locating means carried by said removable unit;

one of said anode and cathode being movable into interfitting relation with said locating means by downward movement relative to said unit, for retention by said means in a predetermined position relative to the unit.

7. An oxidant generator comprising:

a shell for containing a saline solution;

a unit contained within said shell and having a side wall which extends about and defines a first chamber within the unit and which separates said first chamber from a second chamber about the unit;

an anode in one of said chambers and a cathode within the other chamber to be energized by a power source for production of oxidant gases at the anode and sodium hydroxide at the cathode;

said side wall containing at least one aperture through which said chambers are in communication with one another;

an ion permeable membrane secured to said side wall and bridging across said aperture and adapted to pass sodium ions from said anode chamber to said cathode chamber while resisting movement of sodium hydroxide from the cathode chamber to the anode chamber;

said unit, including said side wall thereof and said membrane, being insertible downwardly into said shell and removable upwardly therefrom for repair or replacement;

said anode and cathode extending generally vertically at opposite sides of said side wall and at opposite sides of said membrane; and locating means carried by said removable unit forming an upwardly facing socket recess into which a lower portion of said anode or cathode is insertible downwardly in interfitting relation for retention by said socket recess against horizontal displacement relative to said side wall and said membrane.

8. An oxidant generator comprising:

a shell for containing a saline solution;

a unit contained within said shell and having a side wall which extends about and defines a first chamber within the unit and which separates said first chamber from a second chamber about the unit;

an anode in one of said chambers and a cathode within the other chamber to be energized by a power source for production of oxidant gases at the anode and sodium hydroxide at the cathode;

said side wall containing at least one aperture through which said chambers are in communication with one another;

an ion permeable membrane secured to said side wall and bridging across said aperture and adapted to pass sodium ions from said anode chamber to said cathode chamber while resisting movement of sodium hydroxide from the cathode chamber to the anode chamber;

said unit, including said side wall thereof and said membrane, being insertible downwardly into said shell and removable upwardly therefrom for repair or replacement;

said anode and cathode extending generally vertically at opposite sides of said side wall and at opposite sides of said membrane;

locating means carried by said removable unit forming upwardly facing socket recesses into which lower portions of said anode and cathode are insertible downwardly in interfitting relation locating the anode and cathode against horizontal displacement relative to said side wall and said diaphragm; and a fastener connecting an upper end of said cathode to said side wall of said unit.

9. An oxidant generator as recited in claim 8, including a terminal fastener connected to a side wall of said shell, and a conductor extending radially between said unit and said side wall of said shell and electrically connecting said first mentioned fastener and said terminal fastener.

10. An oxidant generator as recited in claim 9, in which said anode has an upper end portion extending radially outwardly from said side wall of said unit to a side wall of said shell, there being a terminal fastener connected to said side wall of the shell and connected electrically to said upper end portion of said anode.

11. An oxidant generator comprising:

a shell for containing a saline solution;

a unit contained within said shell and having a side wall which extends about and defines a first chamber within the unit and which separates said first chamber from a second chamber about the unit;

an anode in one of said chambers and a cathode within the other chamber to be energized by a power source for production of oxidant gases at the anode and sodium hydroxide at the cathode;

said side wall containing at least one aperture through which said chambers are in communication with one another;

an ion permeable membrane secured to said side wall and bridging across said aperture and adapted to pass sodium ions from said anode chamber to said cathode chamber while resisting movement of sodium hydroxide from the cathode chamber to the anode chamber;

said unit, including said side wall thereof and said membrane, being insertible downwardly into said shell and removable upwardly therefrom for repair or replacement;

said anode and cathode extending generally vertically at opposite sides of said side wall and at opposite sides of said membrane;

locating means carried by said removable unit forming upwardly facing socket recesses into which lower portions of said anode and cathode are insertible downwardly in interfitting relation locating the anode and cathode against horizontal displacement relative to said side wall and said diaphragm;

said anode having an upper end portion extending radially outwardly from said side wall of said unit to a side wall of said shell; and a terminal fastener connected to said side wall of the shell and connected electrically to said upper end portion of said anode.

12. An oxidant generator comprising:

a shell for containing a saline solution;

an ion permeable membrane separating first and second chambers in the shell;

an anode in one of said chambers and a cathode within the other chamber to be energized by a power source for production of oxidant gases at the anode and sodium hydroxide at the cathode;

said membrane being adapted to pass sodium ions toward said cathode while resisting movement of sodium hydroxide toward the anode; and locating means in the shell;

said locating means forming two upwardly facing socket recesses at opposite sides of said membrane into which lower portions of said anode and cathode respectively are insertible downwardly in interfitting relation for retention by said socket recesses against horizontal displacement in the shell.

13. An oxidant generator comprising:

means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said anode chamber being disposed about said cathode chamber;

said circulating means being operable to produce movement of the saline solution within said anode chamber generally circularly about the cathode chamber.

14. An oxidant generator comprising:

means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said circulating means being operable to produce motion of said saline solution along an inclined path to move simultaneously downwardly and horizontally and thereby disperse the salt of the saline solution both vertically and horizontally in the anode chamber.

15. An oxidant generator comprising:

means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode foe movement upwardly within the saline solution to its surface;

said circulating means including a vaned rotor contacting the saline solution in said anode chamber, and a motor driving said rotor.

16. An oxidant generator comprising:

means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said circulating means including a vaned rotor contacting the saline solution within said anode chamber and mounted to turn about an inclined axis advancing simultaneously downwardly and horizontally to cause both downward and horizontal movement of the saline solution, and a motor driving said rotor about said axis.

17. An oxidant generator comprising:

means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said anode chamber extending essentially circularly about said cathode chamber;

said circulating means including a vaned rotor contacting the saline solution within said anode chamber and power driven rotatably to produce movement of said saline solution within the anode chamber and about said cathode chamber.

18. An oxidant generator as recited in claim 17, in which said vaned rotor is mounted to turn about an inclined axis and acts to cause movement of the saline solution along that inclined axis within the anode chamber to simultaneously advance downwardly and generally circularly about the cathode chamber.

19. An oxidant generator comprising:
means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said means forming said chambers including an outer shell having a top wall;

said circulating means including a vaned rotor contacting the saline solution within said anode chamber, a shaft extending downwardly through a top wall of said shell and carrying said rotor, and a motor at the upper side of said shell driving said shaft and rotor to produce circulation of the saline solution.

20. An oxidant generator as recited in claim 19, including a tubular busing carried by said top wall of the shell and through which said shaft extends downwardly into the shell, and a water deflecting element carried by said shaft of said tubular element and disposed essentially across the upper side of said tubular bushing to resist the flow of water downwardly between the shaft and bushing into the interior of the shell.

21. An oxidant generator comprising:
means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said means forming said chambers including an outer shell having a top wall;

said circulating means including a vaned rotor contacting the saline solution within said anode chamber and mounted to turn about an inclined axis, a shaft carrying said vaned rotor and extending along said inclined axis and upwardly through an opening in said top wall of the shell, and a motor at the exterior of the shell driving said shaft and rotor about said inclined axis and in a direction causing the rotor to produce movement of the saline solution along said inclined axis downwardly and also horizontally to disperse the salt of the saline solution throughout the solution.

22. An oxidant generator comprising:
means forming an anode chamber for containing a saline solution and a cathode chamber communicating with the anode chamber;

an anode in said anode chamber and a cathode in said cathode chamber to be energized by a power source for production of oxidant gases at the anode and sodium hydroxide at the cathode;

an ion permeable membrane between said chambers adapted to pass sodium ions from said anode chamber to said cathode chamber and resist movement of sodium hydroxide from the cathode chamber to the anode chamber;

means for withdrawing the oxidant gases from an upper portion of said anode chamber; and means for circulating said saline solution within said anode chamber, to enhance the dispersal of salt and maintain the saline solution at high density throughout the anode chamber, and to displace the oxidant gases from the anode for movement upwardly within the saline solution to its surface;

said means forming said chambers including an outer shell having a tubular member extending generally vertically within said shell, with said anode chamber extending generally circularly about the tubular member and with the cathode chamber being contained within said tubular member;

said circulating means including a vaned rotor contained within said anode chamber and contacting said saline solution therein and mounted to turn about an inclined axis to produce movement of the saline solution along said inclined axis downwardly and also circularly about said tubular member and cathode chamber, a shaft connected to said rotor and extending upwardly along said inclined axis through an opening in the top wall of said shell, and a motor connected to said shaft at the exterior of the shell and driving the inclined shaft and rotor about said inclined axis.

23. An oxidant generator as recited in claim 22, including an inclined tubular bushing disposed about said shaft and connected to said top wall of the shell, and a water deflecting element carried by said shaft above said inclined tubular bushing and projecting laterally to a peripheral edge beyond said bushing and acting to block the flow of water downwardly between said tubular element and shaft.

24. An oxidant generator comprising:

a shell for containing a saline solution;

a unit contained within said shell and having a side wall which extends about and defines a first chamber within the unit and which separates said first chamber from a second chamber about the unit;

an anode in one of said chambers and a cathode within the other chamber to be energized by a power source for production of oxidant gases at the anode and sodium hydroxide at the cathode;

said side wall containing at least one aperture through which said chambers are in communication with one another;

an ion permeable membrane secured to said side wall and bridging across said aperture and adapted to pass sodium ions from said anode chamber to said cathode chamber while resisting movement of sodium hydroxide from the cathode chamber to the anode chamber;

said unit, including said side wall thereof and said membrane, being insertible downwardly into said shell and removable upwardly therefrom for repair or replacement;

said anode and cathode extending generally vertically at opposite sides of said side wall and at opposite sides of said membrane; and locating means carried by said removable unit forming upwardly facing socket recesses into which lower portions of said anode and cathode are insertible downwardly in interfitting relation locating the anode and cathode against horizontal displacement relative to said side wall and said diaphragm.

* * * * *